April 21, 1959 W. A. WULLE Re. 24,637

FORAMINOUS CEILING VENTILATING APPARATUS

Original Filed March 26, 1952 2 Sheets-Sheet 1

Inventor

William A. Wulle by Hill, Sherman, Meroni, Gross & Simpson Attys

April 21, 1959 W. A. WULLE Re. 24,637

FORAMINOUS CEILING VENTILATING APPARATUS

Original Filed March 26, 1952 2 Sheets-Sheet 2

Inventor
William A. Wulle
by Hill, Sherman, Meroni, Gross & Simpson Attys

United States Patent Office

Re. 24,637

Reissued Apr. 21, 1959

24,637

FORAMINOUS CEILING VENTILATING APPARATUS

William R. Wulle, Chicago, Ill., assignor to The Pyle-National Company, Chicago, Ill., a corporation of New Jersey Original No. 2,701,998, dated February 15, 1955, Serial No. 278,544, March 26, 1952. Application for reissue September 4, 1956, Serial No. 607,968

16 Claims. (Cl. 98—40)

Matter enclosed in heavy brackets [ ] appears in the original patent but forms no part of this reissue specification; matter printed in italics indicates the additions made by reissue.

The invention relates generally to ventilating apparatus and more particularly to a ventilating apparatus of the type including a ceiling structure having a frame-work made up of pipes carrying a heat exchange medium and supporting a plurality of pans made of thermally conductive material and forming a continuous radiant ceiling surface, the pans cooperating with suitable cover means to form a plenum chamber adjacent the continuous ceiling surface and also carrying valve controlled means to admit a supply of temperature conditioned ventilating air from a source of higher pressure into the plenum chamber for diffusion outwardly through a foraminous portion of the pan.

According to the general features of the present invention, a ceiling ventilating apparatus comprising a plurality of spaced pipes arranged in coplanar relationship forms a ceiling framework. A pan having a foraminous surface is extended between each pair of adjacent pipes and includes upstanding flanges shaped to clip on to the pipes. When a plurality of pans are thus assembled, a continuous radiant ceiling surface is provided since the pans are made of thermally conductive material and the temperature of the pans is controlled by conducting a heat exchange medium through the pipes.

A duct to carry a supply of temperature conditioned ventilating air at increased pressures is located superadjacent the pipes and is provided with a duct outlet. Wall means cooperate with the pans to form a plenum chamber and a suitable inlet aperture is provided for the plenum chamber. A flexible sleeve is located between the duct outlet and the inlet aperture of the plenum chamber and adjustable valve means are provided in the inlet aperture to control the admission of air at higher pressure into the plenum chamber for diffused distribution outwardly through the foraminous portion of the pan.

It is an object of the present invention to provide a combination ventilating apparatus which will effect the simultaneous distribution of radiant heat and temperature conditioned ventilating air.

Another object of the present invention is to provide an improved ceiling ventilating apparatus.

A further object of the present invention is to provide an air distributing apparatus which is concealed behind and forms a part of a continuous radiant ceiling surface.

Another object of the present invention is to provide an improved ventilating apparatus operable on the so called pressure-displacement principle.

Many other advantages, features and additional objects of the present invention will become manifest to those versed in the art upon making reference to the detailed description which follows and the accompanying sheets of drawings in which a preferred structural embodiment incorporating the principles of the present invention is shown by way of illustrative example only.

A particularly useful application of the principles of the present invention is made in connection with the provision of a ceiling ventilating apparatus although it will be understood that the ventilating apparatus can be advantageously employed with any wall surface of an enclosure or space to be ventilated.

Figure 2:
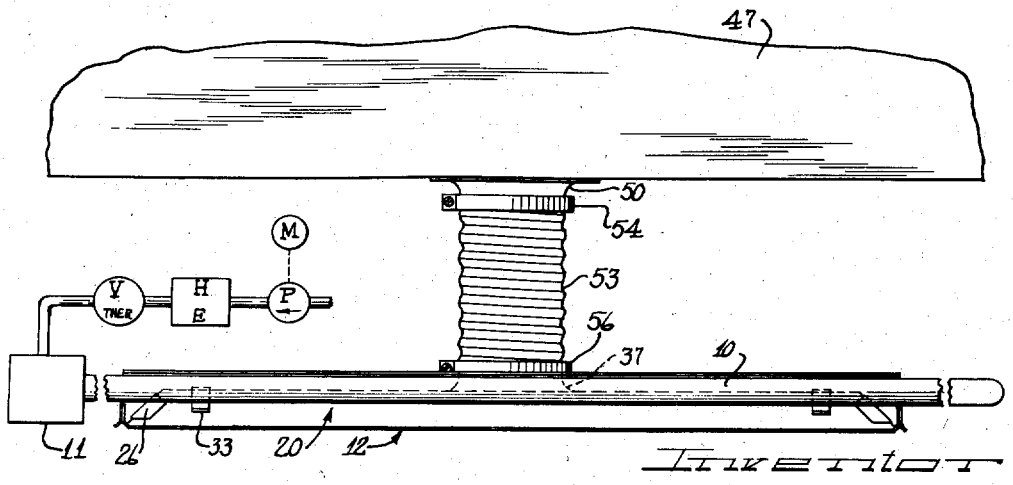
Figure 2 is a fragmentary side elevational view, with parts shown in section, of the structure of Figure 1.

In the preferred embodiment shown by way of illustrative example, a plurality of spaced pipes 10 are arranged in co-planar relationship to form a ceiling framework. It will be understood that the pipes may be supplied with a heat exchange medium and, in this connection, there is indicated in Figure 2 a header 11 supplied with heat exchange medium such as hot water, steam, or in the event cooling is required, a coolant pressurized by a pump P powered by a motor M discharging through a heat exchanger HE and through a thermostatic valve V. It will, of course, be understood that instead of a plurality of separate pipes 10, a tortuously twisted pipe might be arranged to provide the ceiling framework as shown in the drawings.

A continuous ceiling surface is provided by suspending a plurality of standardized pan members 12 on the pipes 10. Each of the pan members 12 is made of a thermally conductive material and is assembled with the pipes 10 in thermally conductive relationship therewith so as to form a radiant ceiling surface which may be effectively utilized to control the distribution of radiant heat energy to the space or enclosure with which the ceiling surface is associated.

In accordance with the principles of the present invention, a ceiling structure thus provided is modified to develop the additional function of distributing temperature condition ventilating air at the same time.

Figure 1:
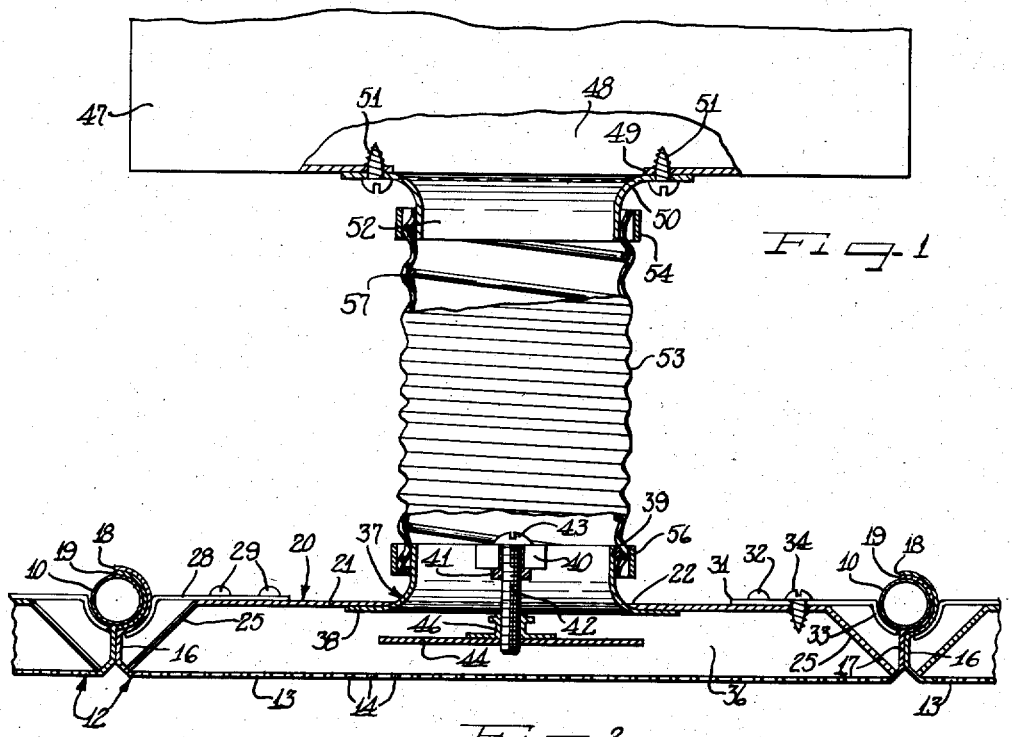
Figure 1 is a fragmentary cross-sectional view with parts shown in elevation and with parts removed for the sake of clarity showing a ventilating apparatus incorporating the principles of the present invention.

Referring specifically to Figure 1, is will be noted that each of the pans 12 extends between a pair of adjacent pipes 10 and includes a first wall portion 13 having a plurality of perforations 14 extending therethrough to render the wall portion 13 foraminous. At opposite margins of the wall portion 13 an upstanding flange 16 and an upstanding flange 17 are provided, each of the flanges 16 and 17 providing side walls for the pan 12 and being provided with an arcuately-shaped clip portion 18 and 19, respectively.

The arcuately-shaped clip portions 18 and 19 are, in effect, of C configuration and it will be noted that both open in the same direction so that a pan member 12 may be moved in general registry with a pair of the pipes 10 and is then laterally displaced until clip portion 18 engages the clip portion 19 of the next adjacent pan member 12 and the clip portion 19 engages the corresponding pipe 10.

A cover member, indicated generally at 20 is provided for each of the pan members 12. The construction of the cover members 20 may be clearly understood by making a particular reference to Figures 3 and 4 in connection with Figure 1 and 2.

Figure 4:
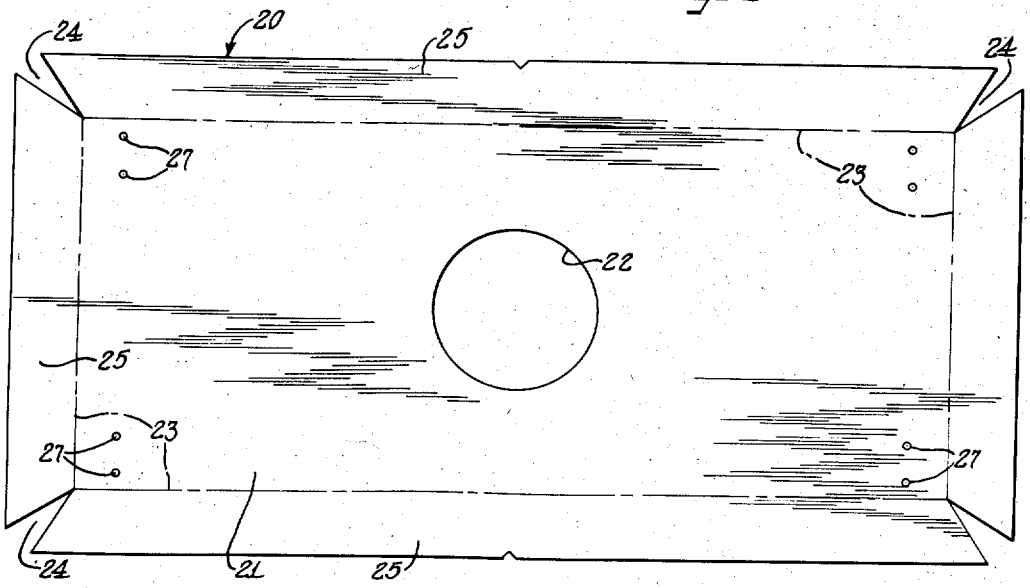
Figure 4 is a view showing a development of the cover member of Figure 3.

Each cover member 20 is made from a flat sheet of metal shaped as shown in Figure 4 and includes a plate portion 21 having an inlet aperture 22 form in a central portion thereof and bounded on its margins by offset flanges 25 which are bent downwardly at an acute angle to the plate portion 21 along the bend lines 23.

Each of the corners of the cover member 20 are notched as at 24 to facilitate abutment of the longitudinal and transverse flanges 25. A retainer member 26 is spot welded to each of the corners after the cover member 20 is formed into proper shape to retain the flanges 22 in locked assembly.

Adjacent each corner of the plate portion 21 of the cover member 20 is provided a pair of apertures 27. On one margin of the plate portion 21, a pair of retainer clips 28 are firmly assembled to the cover member 20 by means of a plurality of rivets 29. Each of the retainer clips 28 comprises a strip which is arcuately shaped as at 30 so as to underlie a part of the clip portion 18 on the flange 16 of the pan member 12.

On the opposite margin, a pair of clip members 31 are pivoted to the plate portion 21 of the cover member 20 by means of rivets 32. Each of the clip members 31 comprises a strip which is arcuately shaped as at 33 and which may be pivoted into position so as to abuttingly underlie a portion of the corresponding pipe 10 after which each of the clips 31 may be placed in firm assembly with the plate portion 21 of the cover member 20 by threading a screw 34 through the corresponding clip member 31 into one of the apertures 27.

The cover member 20 is received by the pan member 12 with the flanges 25 engaging the wall portion 13, thereby spacing the plate 21 relative to the wall portion 13 and forming with the pan member 12 a plenum chamber 36.

A collar 37 flanged as at 38 is spot welded to the plate portion 21 of the cover member 20 and provides an upstanding flange 39 forming a throat for the inlet aperture 22.

A bracket 40 spans the throat or flange 39 and is spot welded thereto in firm assembly therewith. The bracket 40 carries a nut 41 which threadedly receives a bolt 42 having an adjusting head 43 to facilitate turning of the bolt 42, thereby to axially position the bolt relative to the nut 41 and the bracket 40.

The bolt 42 extends into the plenum chamber 36 and carries on the end thereof a valve plate 44 carried by a retainer 46 received on the end of the bolt 42.

Figure 3:
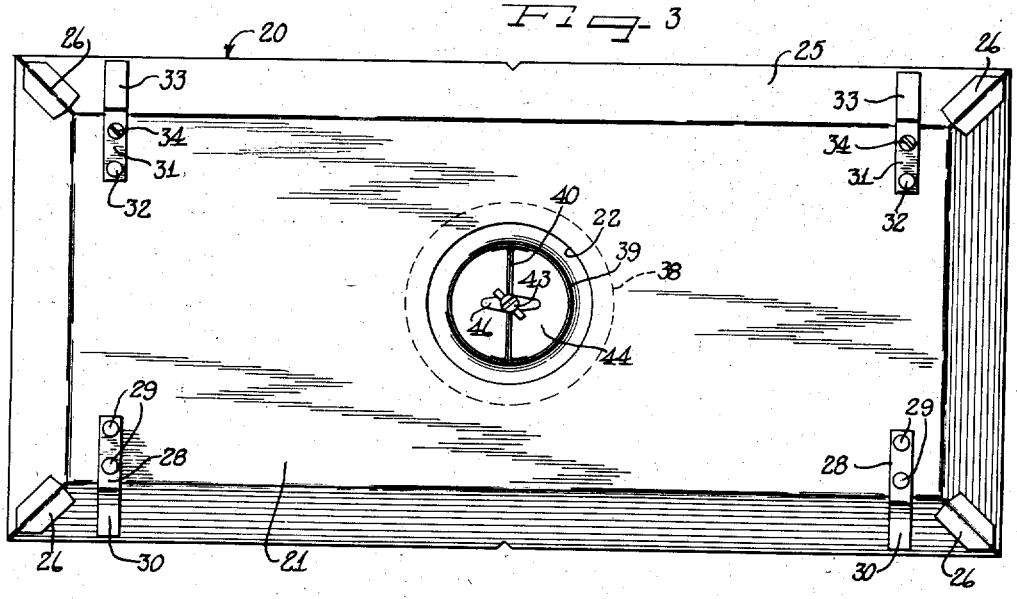
Figure 3 is a plan view of the cover member provided in accordance with the principles of the present invention.

As is shown in Figure 3, the valve plate 44 has substantially the same configuration as the inlet aperture 22 and selective adjustment thereof relative to the throat provided by the flange 39 of the collar 37 will operate to control the admission of air into the plenum chamber 36.

A duct 47 is provided superjacent the ceiling framework provided by the pipes 10 and carries a supply of pressurized temperature conditioned ventilating air. In other words, the duct 47 may be considered as forming a primary plenum chamber 48. A duct outlet 49 is provided and a collar 50 is fastened to the duct 47 by a plurality of fasteners 51, thereby to provide a flange 52 at the duct outlet 49.

It will be understood that the duct 47 and the plenum chamber 36 are relatively spaced from one another. Thus, in order to supply air from the primary plenum chamber 48 to the plenum chamber 36, a generally tubular flexible sleeve 53 is clamped to the flange 52 by means of a clamp retainer 54 and the other end of the sleeve 53 is clamped to the flange 39 by means of a clamp retainer 56.

The sleeve 53 preferably comprises a flexible material which is somewhat rigidified by means of a coil spring 57. It will be appreciated that in a typical architectural installation the duct works for the primary ventilating system such as the duct 47 will be installed prior to the suspension of the ceiling surface afforded by the wall portions 13 of the pan members 12, hence, the use of the present invention affords a wide range of tolerance in locating the duct outlets 49 and the inlets 22 for each of the plenum chambers 36. *In other words, there is an air distributor at the free end of each sleeve 53. The air distributor is formed by the pan and cover members 12 and 20. The upper wall means of the air distributor comprises the inlet-forming portion connected to the flexible sleeve or conduit 53 to receive air from the supply duct 47 and the lower wall means of the air distributor comprises the outlet-forming portion through which air is discharged or diffused into the space being ventilated. Since the upper and lower wall means of the air distributor are joined, all air from the conduit or sleeve 53 is confined and directed through the finished surface of the inner wall and into the space.* In reference to an entire ceiling surface, it will be further appreciated that a plurality of plenum chambers 36 may be located at spaced intervals so that a supply of temperature conditioned ventilating air may be diffused through corresponding portions of the ceiling surface simultaneously with the distribution of radiant heat to the space being ventilated by virtue of the fact that the continuous ceiling surface is radiant in character.

Although various minor structural modifications might be suggested by those versed in the art, it should be understood that I wish to embody within the scope of the patent warranted hereon all such modifications as reasonably and properly come within the scope of my contribution to the art.

I claim as my invention:

1. A ventilating apparatus comprising, a duct carrying pressurized air and having an outlet aperture in one wall thereof, a first collar on said one wall providing a flange around said outlet aperture, an enclosure spaced from said duct and providing a plenum chamber, one wall of said enclosure comprising a perforate distribution panel for diffusing air outwardly from said plenum chamber, a second wall of said enclosure having an inlet aperture formed therein, a second collar on said second wall forming a flange around said inlet aperture, a flexible tubular sleeve receiving said collars at opposite ends thereof, clamping means connecting said sleeve and said collars in firm assembly, a bracket bridging said second collar and carrying an adjustment nut in firm assembly therewith, a bolt threaded into said nut and extending toward said plenum chamber, a valve plate on the end of said bolt to selectively adjust the effective size of said inlet aperture upon threadedly positioning said bolt and said nut to admit controlled quantities of air from said duct into said plenum chamber, and pipes engaging said pan in thermally conductive assembly therewith to support said pan and to control the temperature of said pan to form a radiant heating surface.

2. In a room ventilating apparatus, a pair of pipes, a pan member made of thermally conductive material and having a foraminous plate-like surface flanged at opposite margins to provide side walls therefor, each of said side walls having a C shaped clip portion receiving a corresponding one of said pipes, a cover member for said pan member and together therewith forming a plenum chamber, said cover member comprising a plate having flanged margins to provide side walls therefor, said cover member received by said pan member with said side walls of said cover member engaging said foraminous surface and said plate being spaced from said foraminous surface, a first clip means adjacent one margin of said plate and having an arcuately-shaped portion to abut against the corresponding side wall of said pan member, a second clip means adjacent the opposite margin of said plate comprising a finger member pivoted on said plate and having an arcuate end portion to engage the corresponding one of said pipes in opposition to the corresponding side wall of said pan member, fastener means to lock said second clip means in assembled relationship relative to said pipe and said pan member, said plate having an inlet aperture therein, and valve means in said aperture to control the admission of air into said plenum chamber for diffused distribution through said pan member.

3. In a ventilating system, the combination with a wall or a ceiling of a space to be ventilated of an inner wall spaced interiorly of said wall or ceiling, a supply duct extending into the space behind said inner wall, at least one outlet formed in said supply duct, at least one opening formed in said inner wall, an air distributor chamber comprising a lower wall means providing a distributing diffuser type outlet and upper wall means having an inlet formed therein, said upper wall means having side portions contacting said lower wall means to form together therewith the said chamber, means fastening said chamber in said opening in said inner wall, a collar on said upper wall means providing a flange at said inlet, and a sleeve of flexible material for each outlet in said supply duct and having one end connected to a corresponding collar on said chamber, said sleeve having means at its other end to connect said sleeve to said outlet in said supply duct.

4. In a ventilating system, the combination with a wall or a ceiling of a space to be ventilated of an inner wall spaced interiorly of said wall or ceiling, a supply duct extending into the space behind said inner wall, said supply duct and said inner wall having a plurality of openings formed therein, a plurality of air distributing chambers each comprising lower wall means providing an air distributing outlet and upper wall means having an inlet formed therein, said upper wall means having side portions contacting said lower wall means to provide said chamber, means fastening said chambers in said openings in said inner wall, a collar on said upper wall means of each respective chamber providing a flange at said inlet, and a flexible sleeve for each chamber having one end connected to said collar, said other end of each sleeve having means to connect said sleeve to a corresponding outlet in said supply duct.

5. In a ventilating system as defined in claim 4, an adjustable valve controlling the flow of air through each respective sleeve, whereby all valves in all of said sleeves may be pre-set to balance the system distribution of air from said supply duct to said air distributing chambers and throughout the space.

6. In a ventilating system as defined in claim 4, said means at said other end of said sleeve connecting said sleeve to a corresponding outlet in said supply duct comprising a collar providing a flange at the outlet in the supply duct and an adjustable valve in one of said collars for controlling the flow of air through each respective sleeve.

7. In a ventilating system as defined in claim 4, said inner wall more particularly comprising an acoustical metal pan ceiling including a pluraliy of perforated metal pans, said lower wall means of each of said air distributing chambers providing with said metal pan ceiling a unified coplanar finished surface.

8. In a ventilating system as defined in claim 4, said inner wall more particularly comprising an acoustical metal pan ceiling including a plurality of perforated metal pans and said lower wall means of each of said air distributing chambers comprising one of said perforated metal pans.

9. In a ventilating system as defined in claim 4, said inner wall more particularly comprising a plurality of spaced pipes arranged in coplanar relation to form a framework as well as a conduit network, and a plurality of metal thermally conductive pans connected to said pipes and presenting a continuous finished wall surface to the interior of the compartment, and means supplying a heat exchange medium to said pipes to control the temperature of said inner wall.

10. In a ventilating system, the combination with a ceiling of a space to be ventilated of a suspended false ceiling suspended interiorly of said ceiling, said false ceiling comprising a plurality of metal pans perforated to provide an acoustical finished ceiling surface for the interior of the space, at least one supply duct extending into the space behind said false ceiling, said supply duct and said false ceiling having a plurality of openings formed therein, a corresponding plurality of air distributing chambers each comprising a lower wall means providing an air distributing diffuser type outlet and an upper wall means assembled on said lower wall means, said upper wall means having side portions engaging said lower wall means and forming together therewith the said air chamber, said upper wall means having an inlet formed therein for said chamber, means fastening said chambers in said openings in said false ceiling, a collar on said upper wall means of each respective chamber providing a flange at said inlet, and a flexible sleeve for each chamber having one end connected to said collar, said other end of each sleeve having means to connect said sleeve to a corresponding outlet in said supply duct.

11. In combination with a wall or a ceiling of a space to be ventilated having an inner wall spaced interiorly of the wall or ceiling, a ventilating system comprising, a supply duct having an inlet adapted to receive a supply of ventilating air at increased pressure, said supply duct extending into the space behind said inner wall and having a plurality of separate spaced apart outlet units, said outlet units each including a flexible conduit communicating with and leading from said supply duct, and a terminal air distributor at the free end of said conduits, said terminal air distributor comprising upper and lower wall means having engaging side portions and together forming a plenum chamber, said lower wall means providing an outlet through which air is discharged, and mounting means connecting said air distributor to said inner wall, said lower wall means of said air distributor together with said inner wall forming a finished surface for the interior of the space being ventilated.

*12. In a ventilating system as defined in claim 3, said lower wall means comprising a portion of an air distributor having said outlet formed therein and forming with said inner wall a finished surface at said opening in said inner wall for the interior of the space being ventilated.*

*13. In a ventilating system as defined in claim 4, said lower wall means comprising a portion of an air distributor forming at the corresponding one of said openings in said inner wall a finished surface for the interior of the space being ventilated, and having said diffuser outlet formed therein, said side portions and said upper wall portions comprising a portion of the air distributor confining and directing air from said sleeve through said diffuser-type outlet.*

*14. In a ventilating system as defined in claim 10, said lower wall means extending across a corresponding one of said openings in said false ceiling to form a finished surface at said one of said openings for the interior of the space being ventilated, and having said diffuser-type outlet formed therein, said upper wall means and said side portions confining and directing the flow of air from said flexible sleeve through said diffuser-type outlet.*

*15. In the combination of claim 11, said upper wall means of said terminal air distributor comprising an inlet-forming portion connected to said flexible conduit to receive air from said supply duct, said lower wall means of said terminal air distributor comprising an outlet-forming portion having said outlet formed therein to discharge the air into the space being ventilated, said engaging side portions of said terminal air distributor joining said inlet-forming and said outlet-forming portions to confine and direct the flow of air from the corresponding flexible conduit through said finished surface of said inner wall.*

*16. In a ventilating system, the combination with a wall or a ceiling of a space to be ventilated of an inner wall spaced interiorly of said wall or ceiling, a supply duct extending into the space behind said inner wall, said supply duct and said inner wall having a plurality of openings formed therein, a plurality of air distributors each comprising lower outlet means providing an air distribut-*

*ing outlet and upper inlet means having an inlet formed therein, said upper inlet means having side portions contacting said lower outlet means to direct air from the inlet to the outlet, means fastening said distributors in said openings in said inner wall, a flexible sleeve for each distributor, and means connecting said sleeve to a corresponding inlet of a distributor and to a corresponding outlet in said supply duct.*

References Cited in the file of this patent or the original patent

UNITED STATES PATENTS

| | | |
|---|---|---|
| 2,172,771 | Norris | Sept. 12, 1939 |
| 2,180,945 | Morey | Nov. 21, 1939 |
| 2,203,590 | Bock | June 4, 1940 |
| 2,221,001 | Lucius | Nov. 12, 1940 |
| 2,251,682 | Leadbetter | Aug. 5, 1941 |
| 2,550,810 | Heidbrink | May 1, 1951 |
| 2,683,408 | Brown et al. | July 13, 1954 |
| 2,684,023 | Honerkamp | July 20, 1954 |
| 2,734,446 | O'Day | Feb. 14, 1956 |

FOREIGN PATENTS

| | | |
|---|---|---|
| 114,647 | Germany | Oct. 26, 1900 |
| 375,862 | Great Britain | July 4, 1932 |
| 601,239 | Great Britian | Apr. 30, 1948 |